Dec. 10, 1935.  G. F. CONNELLY  2,023,576
TIRE TREAD SPLITTING APPARATUS
Filed June 20, 1934  2 Sheets—Sheet 1
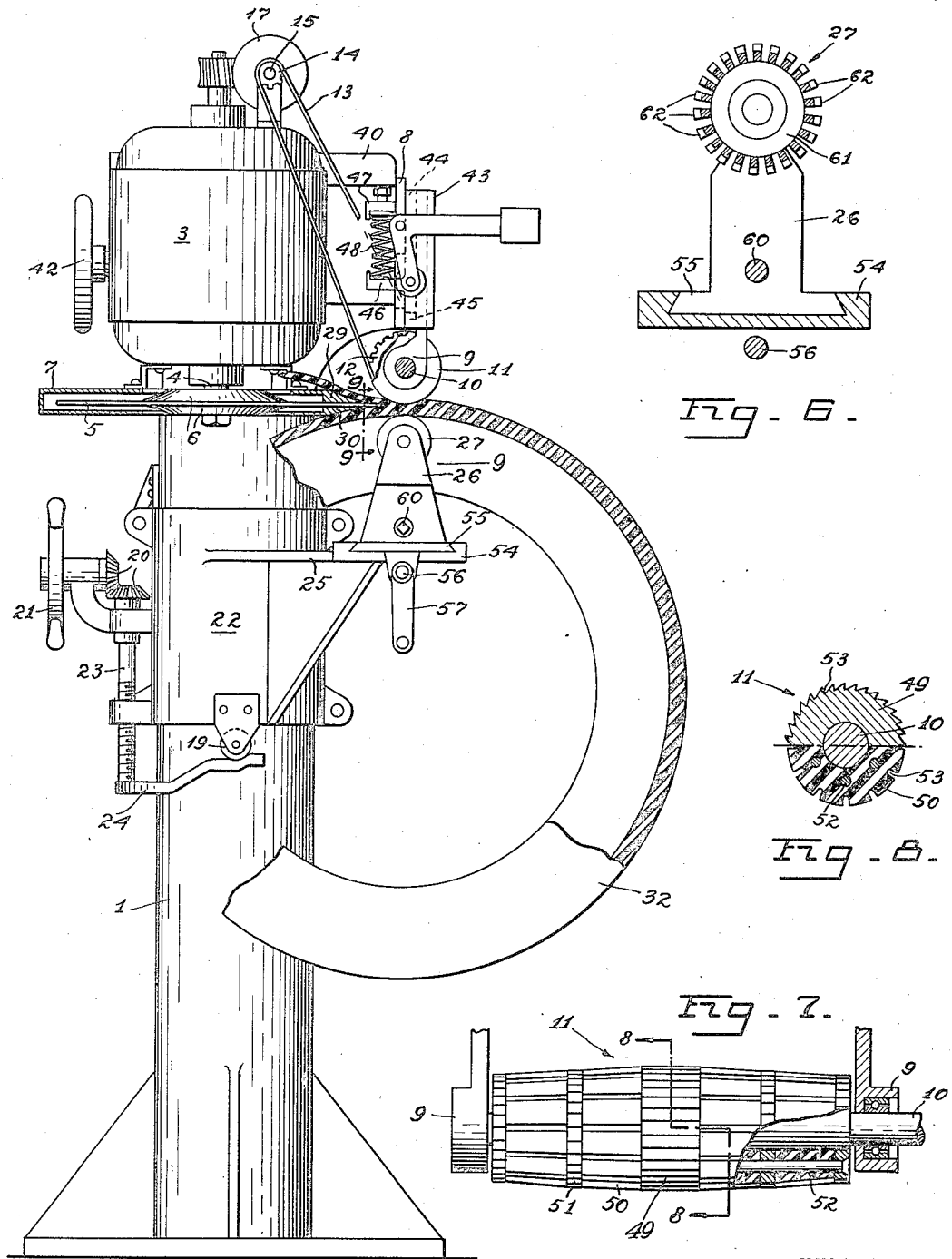
INVENTOR.
GEORGE F. CONNELLY
BY
ATTORNEY

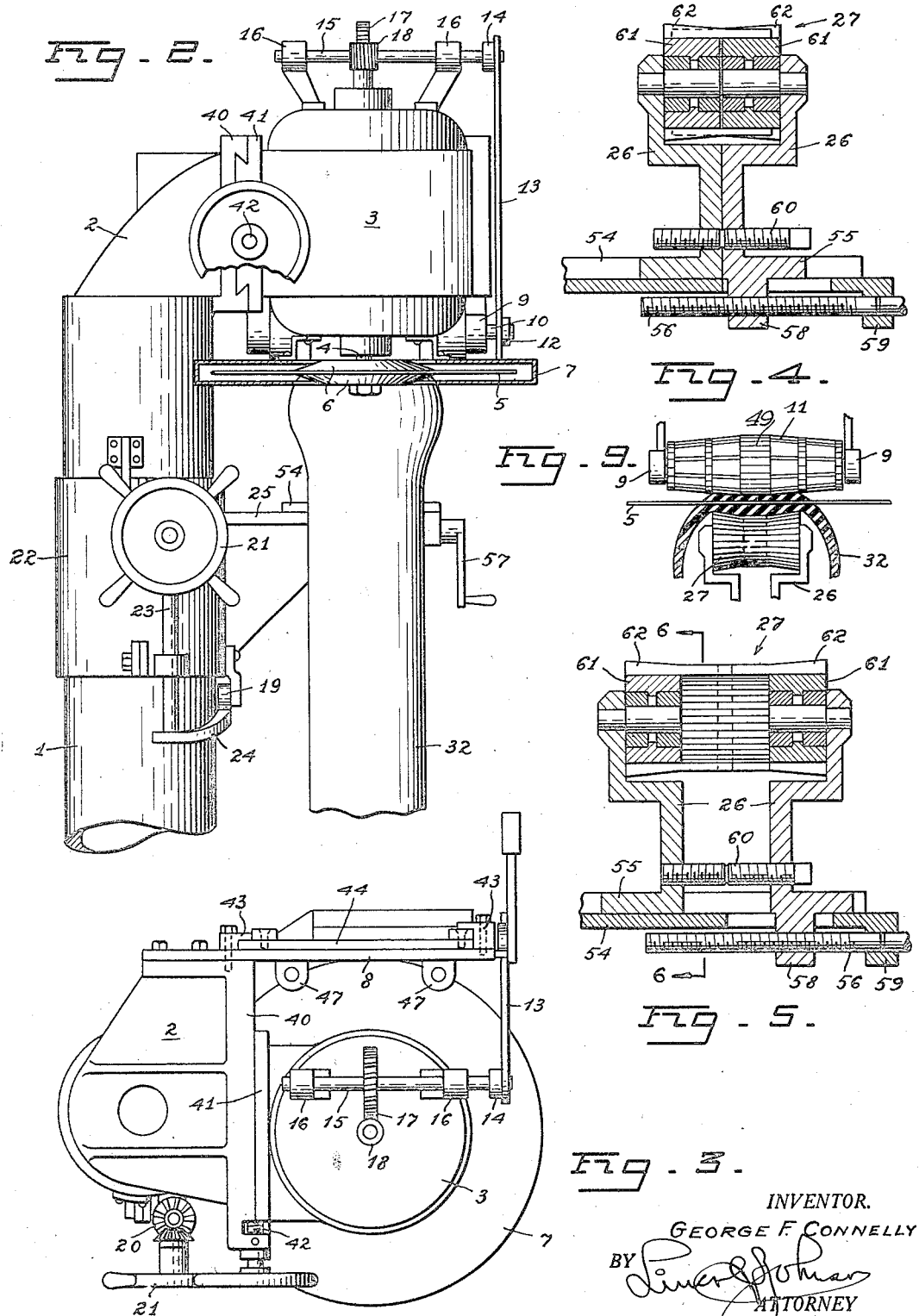

Patented Dec. 10, 1935

2,023,576

UNITED STATES PATENT OFFICE 2,023,576

TIRE TREAD SPLITTING APPARATUS

George F. Connelly, San Francisco, Calif.

Application June 20, 1934, Serial No. 731,408

16 Claims. (Cl. 164—60)

This invention relates particularly to an apparatus for splitting or severing the worn tread surface from a pneumatic tire while maintaining the said tire in its circular form.

An object of the invention is to provide a splitting apparatus adapted particularly to split or remove the worn rubber tread of a pneumatic tire from the carcass of the tire, preliminarily to reteading the carcass.

A further object of the invention is to provide an apparatus for removing the tread surface of a pneumatic tire which will, by continuous operation, automatically cut any selected thickness of the worn tread surface from the tire, means being provided in the apparatus to maintain the normal tread surface of the tire in a flattened position during the period of time in which the said tread surface is being split from the carcass.

Other objects and advantages are to provide an apparatus for removing the treads from tires that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying drawings:

Fig. 1 represents a front elevation of a tire tread splitting apparatus constructed in accordance with my invention.

Fig. 2 is a side elevation of Fig. 1.

Fig. 3 is a plan view of Fig. 2.

Fig. 4 is a cross section taken through the lower pressure roller, and showing the same in contracted position.

Fig. 5 is a cross section similar to Fig. 4, but showing the lower pressure roller in the expanded position.

Fig. 6 is a cross section taken through Fig. 5 on the line 6—6.

Fig. 7 is a side elevation of the upper pressure roller, showing the same partly in section.

Fig. 8 is a cross section taken through Fig. 7 on the line 8—8.

Fig. 9 is a sectional view taken on the approximate line 9—9 of Fig. 1.

In detail the construction illustrated in the drawings comprises a frame of the tread splitting machine which is generally designated by the numeral 1, and which includes the foundation structure on wihch all of the operating parts of the machine are mounted. A head piece 2 is provided on the upper end of the frame 1. The head piece 2 is provided with a transversely disposed guideway 40 thereon and within which a slide member 41 is confined. An electric motor 3 is mounted on the slide 41 with the axis of rotation of the motor in a vertical plane. An adjusting screw 42 is threaded into engagement with the head piece 2, and with the slide 41 for adjusting the position of the motor relative to the head piece 2. The lower end of the shaft 4 of the motor is provided with a circular blade or saw 5, held thereon by clamping flanges 6, or some other equivalent structure. The blade 5 is adapted to rotate in a horizontal plane. The blade is confined within a sheath or guard 7 for safety purposes.

A member 8 is provided on one side of the head piece 2, and extends outwardly therefrom, which member is provided with a vertically disposed guide 43 on a face thereof, in which a slide member 44 is confined. A stop 45 is provided on the guide 43 to limit the downward travel of the slide 44. The face of the member 8 within the guideway 43 is slotted to permit of the projection therethru of a pair of lugs 46 integrally united with the face of the slide 44. Similar lugs 47 are provided on the face of the member 8 in registering alignment with the lugs 46. Expansion springs 48 are interposed between the lugs 46 and 47 to prevent upward movement of the slide 44 except by compressing the springs 48. Bearings 9—9 are provided on the lower edge of the slide 44 within which opposite ends of a shaft 10 are journaled on a plane parallel to that of the blade 5. A roller 11 is fixed to the shaft 10 between the bearings 9—9, which roller has a barreled or convex center portion. The roller 11 is formed with a metal center portion 49 and with resilient portions 50 on opposite sides thereof. The metal center portion 49 of the roller is not compressible, whereas the remaining portions of the roller are formed of material such as rubber which will yield when pressure is applied thereto. Driving rings 51 are interposed in the resilient sections of the rubber, and said driving rings are secured to the center member by bolts 52. The circumferential face of the center member 49, the resilient end members 50, and the drive rings 51, are serrated or toothed as indicated at 53, to provide adequate friction surface to rotate any object with which said roller 11 may come in contact. The shaft 10 and roller 11 are rotated by a gear 12 fixed to the end of the shaft. The gear 12 is driven by a sprocket chain 13 which in turn is driven by a sprocket 14 mounted on a shaft 15 supported in bearings 16 on the motor 3. A tightener for the drive chain 13 is provided to keep a suitable degree of tension on the chain 13 whenever and at such times as the distance between the centers of the shaft 15 and roller 11 changes. The shaft 15 is provided with a worm wheel 17 thereon, in meshing engagement with a worm 18 on the upper end of the motor shaft 4.

A collar 22 is rotatably mounted upon the body of the frame 1, said collar having a vertically disposed adjusting screw 23 in threaded engagement therewith. A fixed flange 24 is provided around one half of the circumference of the frame 1, and an end of the screw 23 is adapted to engage the upper face of the shoulder 24 for moving the collar 22 axially on the frame. The shoulder 24 is curved on a horizontal plane and the collar 22 is provided with a roller 19 on the lower end thereof, which roller is adapted to ride on the flange 24 when said collar 22 is rotated relative to the frame 1. The pitch of the flange 24 accomplished a selected degree of axial movement of the collar 22. Further axial movement of the collar 22 is obtained by turning the screw 23 against the fixed flange 24. In actual operation, the screw 23 would be withdrawn from contact with the flange 24 whenever and at such times as the collar 22 would be rotated or moved about the frame 1. For ease of operation, the screw 23 is provided with cooperating bevel gears 20 and with a hand wheel 21. The hand wheel 21 and screw 23 effect the adjustment of the bottom roller 27, to be hereinafter described, relative to the upper roller 11.

The collar 22 is provided with an extended bracket 25 on one side thereof, and on the upper face of said bracket 25 there is provided a guideway 54 within which a slide 55 is mounted. The slide 55 is moved in the guide 54 by means of a screw 56 and handle 57. The screw 56 is in threaded engagement with a lug 58 on the bottom face of the slide 55, and opposite ends of said screw 56 are fixedly supported in journals 59 on the bottom face of the bracket 25. A pair of members 26—26 are provided on the upper face of the slide 55, which members have a concave roller 27 journaled therein on a horizontal plane so that when in the operating position the concave roller 27 will complement the convex roller 11. The members 26—26 are connected together adjacent the base thereof by a screw 60, which has right and left hand threads thereon, whereby rotation of the screw in one direction will move the members 26—26 apart, and movement of said screw in the opposite direction will bring said members together. The roller 27 is comprised of a pair of end members 61—61 on which there are provided in spaced circumferential relation therearound, a plurality of ribs or fingers 62, whereby the ends of the ribs or fingers 62 will lap or telescope together, the ribs on one member 61 being offset relative to the ribs on the other member, and the ribs of one member will lie in the space between the ribs of the other member. The outer circumferential edge of the ribs 62 tapers downwardly from the end thereof toward the center so that the roller 27 posesses this concave shape when in the contracted position shown in Fig. 4 or in the expanded position shown in Fig. 5. The roller 27 is made adjustable along the line of its major axis so that tires of different diameters may be placed thereon and the proper amount of the tread surface thereof flattened to facilitate slicing of the worn tread section therefrom. The expanding roller 27 eliminates the necessity of substituting rollers of different lengths in lieu thereof, accordingly as tires of different diameters are having treads removed therefrom.

In order to place a tire in the tread removing position on the concave roller 27, the collar 22 is dropped until it rests against the flange 24 and swung around thru an arc of from 90° to 180° from the position shown in Fig. 1, which permits of the placement of the tire 32 in pendant or handing position on the roller 27. The collar 22 is then swung back toward the roller 11 and the screw 23 is turned to elevate the tire into contact with the under face of the upper driving roller 11. As the lower roller 27 advances the tread portion of the tire into contact with the upper roller 11, said tread of the tire is gradually flattened out, whereby the area of the tread which it is desired to cut from the tire carcass registers with the cutting edge of the knife 5. The concave and convex rollers cause the interior portion of the tire to be forced into the concave body of the lower roller, whereby the rubber on the tire carcass may be removed uniformly therefrom. If the rollers 11 and 27 should be of uniform diameter throughout, then the circular cutting knife 5 would cut away or split a lesser thickness of the tread rubber from the opposite sides of the tire than along the center of the tire. The concave and convex rollers compensate for this last mentioned effect, so that the worn tread rubber is removed from the carcass at a uniform depth relative to the said carcass.

In order to prevent deflection of the cutting edge of the knife 5 at the point of contact with the tire tread, I have provided a two part guide member indicated by the numerals 29 and 30, having therebetween a recess within which the blade 5 is guided. The portions 29—30 of the guide member are supported by the guard 7. In the operative position the cutting edge of the knife is adapted to approximately line up in front of a vertical line drawn through the axes of the rollers 11 and 27, and the upper and lower faces of the guide members 29 and 30 are beveled to facilitate disposition of the worn tire tread as it is severed from the tire.

The tire 32 is rotated in a counter-clockwise direction on the lower roller 27 by the driving movement of the upper roller 11. The depth of the tread to be removed from the carcass of the tire 32 is regulated either by the degree of compression exerted upon the tread surface of the tire between the concave roller 11 and the convex roller 27, or by the placement of the cutting knife relative to the tire carcass. In the tread removing operation, the tire is continuously advanced toward the cutting knife 5, and the tread removing operation is performed while maintaining the tire in its full circular shape.

A normal cut of worn tread rubber will be removed from the tire by raising the lower roller 27 to a point where the tire body will be flattened out between it and the upper roller 11. By advancing the lower roller 27 still closer to the upper roller 11, the side edges of the tread surface of the tire will be forced upwardly onto the resilient end portions of the upper roller 11, thereby permitting a greater thickness of worn tread rubber to be removed along opposite sides of the said tire, than at the center. In order to regulate the thickness of the tread to be removed from the tire, either the lower roller 27 may be advanced toward the upper roller 11, causing said roller 11 and the slide 44 on which it is mounted, to move upwardly against tension of the spring 48, or the cutting knife 5 may be moved (in conjunction with the motor 3 on the slide 41 in the guideway 40) to a selected position relative to the rollers 11 and 27. The closer the knife is adjusted to the tire carcass, the greater will be the thickness of the worn tread to be cut therefrom. The spring 48 holds the roller 11 down in a position which will permit of a predetermined thickness of the tread rubber to be cut from the tire carcass, and any cut in excess of the predetermined one, can be made by moving the upper roller 11 to effect the compression of the spring 48.

The lower roller 27 may be adjusted by means of the screw 56 along the line of the major axis of the upper roller 11 and relative to the enlarged central diameter of said roller, thus permitting the thread to be cut from along either side of a tire, should it be desirable to do so.

Having thus described this invention, what I claim and desire to secure by Letters Patent is:

1. An apparatus to cut the curved tread from a full circle tire consisting of a roller to be inserted within the tire and to support the tire in hanging position thereon; a driven roller to contact the outer tread surface of the tire in complementary relation to said first mentioned roller; means to move the first mentioned roller on which the tire is supported into contact with the other roller to thereby flatten the tread portion of the tire; a circular cutting knife having the cutting edge disposed on a plane between said rollers; and means to drive the knife and driven roller in unison.

2. An apparatus to cut the curved tread from a full circle tire consisting of a concave roller to be inserted within the tire and to support the tire in hanging position thereon; a driven convex roller to contact the outer tread surface of the tire in complementary relation to said first mentioned roller; means to move the first mentioned roller on which the tire is supported into contact with the other roller to thereby flatten the tread portion of the tire between said convex and concave rollers; a circular knife having the cutting edge disposed on a plane between said rollers; and means to drive the knife and driven roller in unison.

3. An apparatus to cut the tread from a full circle pneumatic tire casing, comprising a pair of rollers engaging opposite sides of the tread of the tire to flatten the same, one of said rollers being driven to continuously rotate the circular tire and the other of said rollers being of a length substantially the same as the diameter of the tire to enter the inside of the tire; and a circular cutting knife adjacent the flattening means to sever the tread from the flattened portion of the tire while it is rotated.

4. An apparatus to cut the curved tread from a full circle tire consisting of a roller to be inserted within the tire to support the tire in hanging position thereon; a driven roller to contact the outer tread surface of the tire in complementary relation to said first mentioned roller; means to move the first mentioned roller on which the tire is supported into contact with the other roller to thereby flatten the tread portion of the tire; a circular knife having the cutting edge disposed on a plane between said rollers; means to adjust the cutting knife relative to said rollers; and means to drive the knife and driven roller in unison.

5. An apparatus to cut the tread from a full circle pneumatic tire casing, comprising a pair of rollers engaging opposite sides of the tread of the tire to flatten the same, one of said rollers being driven to continuously rotate the circular tire and the other of said rollers being of a length substantially the same as the diameter of the tire to enter the inside of the tire; a circular cutting knife adjacent the flattening means to sever the tread from the flattened portion of the tire while it is rotated; and means to adjust the cutting knife relative to said rollers.

6. An apparatus to cut the tread from a full circle pneumatic tire casing, comprising concave and convex rollers engaging opposite sides of the tread of the tire to flatten the center of the tread portion below the plane of the opposite sides of said tread portion into a concavo-convex shape, one of said rollers being driven to continuously rotate the circular tire and the other of said rollers being of a length substantially the same as the diameter of the tire to enter the inside of the tire; a circular cutting knife adjacent the flattening means to sever the tread from the flattened portion of the tire while it is rotated; and means to adjust the cutting knife relative to said rollers.

7. An apparatus to cut the tread from a full circle pneumatic tire casing, consisting of a frame; a motor, with its shaft disposed in a vertical position, on said frame; a circular knife on said motor shaft rotatable in a horizontal plane; a convex roller drivingly mounted on said frame with the axis thereof parallel to the upper face of said knife; a concave roller, complementing the convex roller, having the axes thereof parallel to the under face of said knife; a collar slidably and rotatably mounted on said frame and having said concave roller mounted thereon; and means on said collar engaging said frame to move the concave roller into and from operating relationship with the convex roller.

8. An apparatus to cut the tread from a full circle pneumatic tire casing, consisting of a frame; a motor with its shaft disposed in a vertical position, on said frame; a circular knife on one end of said motor shaft rotatable in a horizontal plane; a convex roller drivingly mounted on said frame with the axes thereof parallel to the upper face of said knife; means on the other end of said motor shaft to drive said convex roller; a concave roller, complementing the convex roller, having the axes thereof parallel to the under face of said knife; a collar slidably and rotatably mounted on said frame and having said concave roller mounted thereon; and means on said collar engaging said frame to move the concave roller into and from operating relationship with the convex roller.

9. An apparatus to cut the curved tread from a full circle tire consisting of a roller to be inserted within the tire and to support the tire in hanging position thereon; means to expand the length of said roller in line with its major axis; a driven roller to contact the outer tread surface of the tire in complementary relation to said first mentioned roller; means to move the first mentioned roller on which the tire is supported into contact with the other roller to thereby flatten the tread portion of the tire; a circular knife having the cutting edge disposed on a plane between said rollers; and means to drive the knife and driven roller in unison.

10. An apparatus to cut the curved tread from a full circle tire consisting of a roller to be inserted within the tire and to support the tire in hanging position thereon; a driven roller to contact the outer tread surface of the tire in complementary relation to said first mentioned roller; a movable support for said driven roller; means to move the first mentioned roller on which the tire is supported into contact with the other roller to thereby flatten the tread portion of the tire; a circular knife having the cutting edge disposed on a plane between said rollers; and means to drive the knife and driven roller in unison.

11. An apparatus to cut the curved tread from a full circle tire consisting of a roller to be inserted within the tire to support the tire in hanging position thereon; a driven roller to contact the outer tread surface of the tire in complementary relation to said first mentioned roller; means to support said driven roller in adjustable relationship to said first mentioned roller; means to move the first mentioned roller on which the tire is supported into contact with the other roller to thereby flatten the tread portion of the tire; a circular knife having the cutting edge disposed on a plane between said rollers; means to adjust the cutting knife relative to said rollers; and means to drive the knife and driven roller in unison.

12. In a tire tread removing machine, a roller to be inserted within a full circle tire and to support the tire in hanging position from a point on the upper diameter of said tire, said roller consisting of a pair of like halves having circumferentially disposed ribs therearound, with the ribs of one half in telescopic engagement with the ribs of the other half; and means to adjust said halves axially to contract or expand the length of said roller to suit the tire supported thereon.

13. An apparatus to cut the curved tread from a full circle tire consisting of a roller to be inserted within the tire and to support the tire in hanging position thereon; a driven roller to contact the outer tread surface of the tire in complementary relation to said first mentioned roller; means to move the first mentioned roller on which the tire is supported into contact with the other roller to thereby flatten the tread portion of the tire; means to adjust the first mentioned roller along the line of the major axis of the driven roller and relative to an end of said driven roller thereby to engage a selected portion of the periphery of the tire with said driven roller; a circular knife having the cutting edge disposed on a plane between said rollers; and means to drive the knife and driven roller.

14. An apparatus to cut the curved tread from a full circle tire consisting of a concave roller to be inserted within the tire and to support the tire in hanging position thereon; a driven convex roller to contact the outer tread surface of the tire in complementary relation to said first mentioned roller; means to move the first mentioned roller on which the tire is supported into contact with the other roller to thereby flatten the tread portion of the tire between said convex and concave rollers; means to adjust the first mentioned roller along the line of the major axis of the driven roller and relative to an enlarged central diameter of said driven roller thereby to engage a selected portion of the periphery of the tire with said driven roller; a circular knife having the cutting edge disposed on a plane between said rollers; and means to drive the knife and driven roller.

15. An apparatus to cut the tread from a full circle pneumatic tire casing, comprising a pair of rollers engaging respectively the inside and outside of the tread of the tire to flatten the same, the outside roller being driven to continuously rotate the circular tire and the inside roller being adjustable relative to the outside roller on a plane parallel thereto and along the axis thereof; and a circular cutting knife adjacent the rollers to cut the tread from the flattened portion of the tire as the tire is advanced toward the knife by the rollers.

16. An apparatus to cut the tread from a full circle pneumatic tire casing, comprising a pair of rollers engaging respectively the inside and outside of the tread of the tire to flatten the same, the outside roller being convex and being driven to continuously rotate the circular tire and the inside roller being concave and being adjustable relative to the enlarged central diameter of said outside roller on a plane parallel thereto and along the axis thereof; and a circular cutting knife adjacent the rollers to cut the tread from the flattened portion of the tire as the tire is advanced toward the knife by the rollers.

GEORGE F. CONNELLY.